United States Patent

Nelson et al.

[11] Patent Number: 5,974,122
[45] Date of Patent: *Oct. 26, 1999

[54] METHOD AND TELECOMMUNICATION SYSTEM FOR TRANSMITTING A FACSIMILE MESSAGE

[75] Inventors: Mark H. Nelson, Chicago; Thomas F. Stevens, Streamwood, both of Ill.; Matthew J. Yuschik, Andover, Mass.; Jeffery J. Meek, Lake in the Hills, Ill.

[73] Assignee: Ameritech Corporation, Hoffman Estates, Ill.

[*] Notice: This patent is subject to a terminal disclaimer.

[21] Appl. No.: 08/787,347

[22] Filed: Jan. 27, 1997

[51] Int. Cl.$^6$ .......................... H04M 11/00; H04M 7/00; H04M 1/00
[52] U.S. Cl. ............ 379/100.09; 379/230; 358/407
[58] Field of Search ................ 379/67, 88–89, 379/100.01, 100.05–100.09, 100.12, 100.14–100.15, 201, 210, 211, 230, 220, 93.14, 93.24; 358/407, 440, 442, 444, 468, 402, 403, 400

[56] References Cited

U.S. PATENT DOCUMENTS

| | | | |
|---|---|---|---|
| 4,922,348 | 5/1990 | Gillon et al. | 358/400 |
| 4,935,955 | 6/1990 | Neudorfer | 379/100.09 |
| 4,994,926 | 2/1991 | Gordon et al. | 358/400 |
| 5,014,300 | 5/1991 | Harvath et al. | 379/100.09 |
| 5,146,348 | 9/1992 | Kaneyama | 379/100.09 |
| 5,170,428 | 12/1992 | Watanabe et al. | 358/402 |
| 5,291,302 | 3/1994 | Gordon et al. | 358/402 |
| 5,291,546 | 3/1994 | Giler et al. | 358/402 |
| 5,299,255 | 3/1994 | Iwaki et al. | 358/402 |
| 5,321,741 | 6/1994 | Kaneko et al. | 379/100.14 |
| 5,339,174 | 8/1994 | Harris | 358/400 |
| 5,392,336 | 2/1995 | Chang et al. | 358/402 |
| 5,444,774 | 8/1995 | Friedes | 379/210 |
| 5,459,584 | 10/1995 | Gordon et al. | 358/400 |
| 5,467,390 | 11/1995 | Brankley et al. | 379/93.14 |
| 5,475,737 | 12/1995 | Garner et al. | 379/67 |
| 5,566,235 | 10/1996 | Hetz | 379/201 |
| 5,583,926 | 12/1996 | Venier et al. | 379/220 |
| 5,592,541 | 1/1997 | Fleischer, III et al. | 379/220 |
| 5,600,710 | 2/1997 | Weisser et al. | 379/265 |
| 5,729,595 | 3/1998 | Kugell et al. | 379/100.09 |
| 5,740,237 | 4/1998 | Malik et al. | 379/211 |
| 5,754,640 | 5/1998 | Sosnowski | 379/211 |

FOREIGN PATENT DOCUMENTS

| | | |
|---|---|---|
| 0 360 732 A2 | 3/1990 | European Pat. Off. . |
| WO 92/14334 | 8/1992 | WIPO . |

*Primary Examiner*—Curtis A. Kuntz
*Assistant Examiner*—George Eng
*Attorney, Agent, or Firm*—Brinks Hofer Gilson & Lione

[57] ABSTRACT

A method and system for transmitting a facsimile message uses a public-switched telecommunications network, the public-switched telecommunication network having a messaging platform capable of storing a plurality of facsimile messages. The initiation of a telephone call to a destination is detected, the content of the call including the facsimile message. If the destination is available at a first time to receive a telephone call, the facsimile message is transmitted. The facsimile message is stored on the messaging platform only if the destination is unavailable at the first time. If the facsimile message was stored, the facsimile message is transmitted at a second time if the destination if the destination is available.

19 Claims, 9 Drawing Sheets

METHOD AND TELECOMMUNICATION SYSTEM FOR TRANSMITTING A FACSIMILE MESSAGE

TECHNICAL FIELD

The present invention relates to telecommunication systems, and in particular to systems and methods for storing and transmitting facsimile messages.

BACKGROUND ART

Facsimile machines or more commonly "fax" machines are used for sending documents and other images from place to place over the telephone network. The originating fax machine places a telephone call to a destination fax machine. The content of the telephone call is a modulated waveform that represents the image to be transmitted. In some cases the destination line is busy or there is no answer, perhaps because the destination fax is either sending or receiving another fax or the destination fax is broken or out of paper. If a call can not be competed, most fax machines will attempt to redial the destination fax machine periodically in an attempt to complete the fax transmission. When the originating fax is attempting to complete the fax transmission, this can monopolize all or partial use of the fax machine for a period of time.

U.S. Pat. No. 4,922,348 issued to Gillon et al. solves some of the related problems by recognizing a fax message and directing fax messages to a storage unit where they later can be forwarded to a destination fax machine or high-speed printer. By always storing fax messages in a fax storage unit, the system of Gillon et al. requires a great deal of storage and throughput capabilities to handle large volumes of fax traffic.

BRIEF DESCRIPTION OF THE DRAWINGS

The invention is pointed out with particularity in the appended claims. However, other features of the invention will become apparent and the invention will be best understood by referring to the following detailed description in conjunction with the accompanying drawings in which:

DETAILED DESCRIPTION OF THE PREFERRED EMBODIMENTS

The various embodiments of the present invention yield several advantages over the prior art. In one embodiment, the telecommunication system and method of the present invention transmit a fax message directly to the destination and store a fax message at a messaging platform only if the destination for the fax is busy or does not answer. This provides advantages from the prior art by decreasing the use of the messaging platform—from all facsimile transmissions—to only those transmissions where the destination either is busy or does not answer.

In one embodiment of the present invention, the methods described herein are implemented in an Advanced Intelligent Network (AIN) used by many local exchange carriers and interexchange carriers. This provides an efficient and uniform method of implementation for both local and long-distance telecommunication service.

Figure 1:
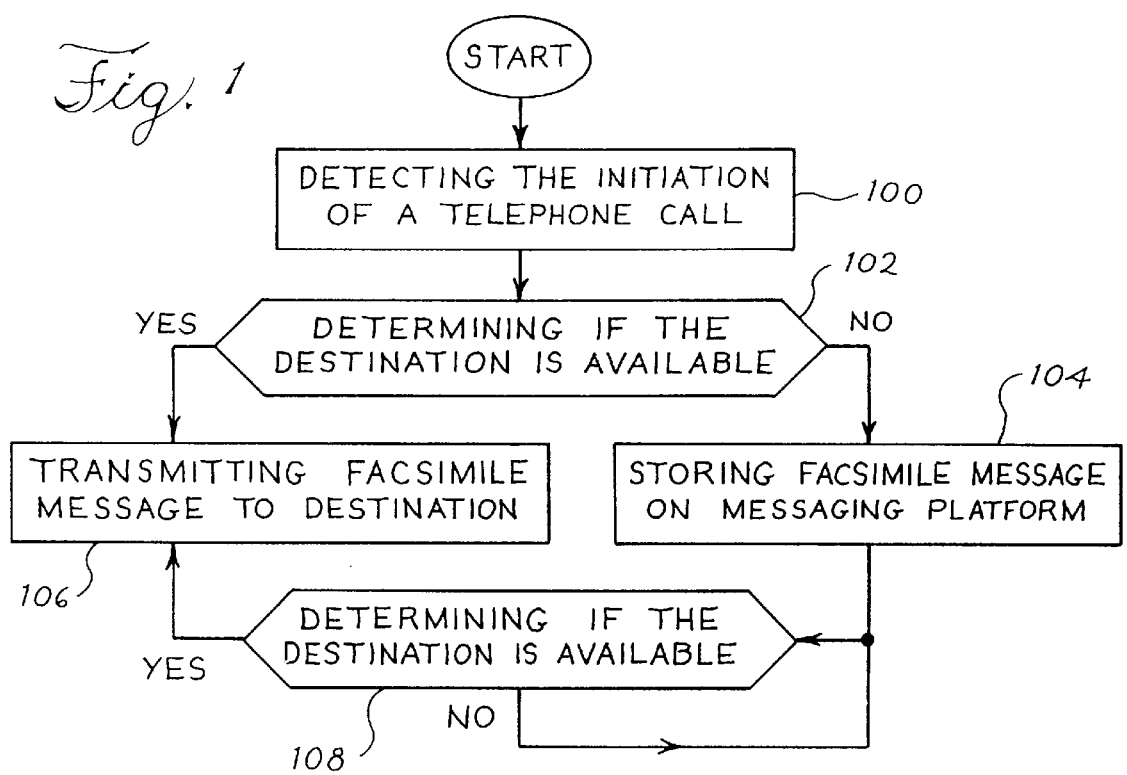
FIG. 1 presents a flowchart representation of a method in accordance with the present invention.

FIG. 1 presents a flowchart representation of a method in accordance with the present invention. This flowchart illustrates a method of transmitting a facsimile message using a public-switched telecommunications network, the public-switched telecommunication network having a messaging platform capable of storing a plurality of facsimile messages. The method begins in step 100 by detecting the initiation of a telephone call to a destination on the telecommunications network, the content of the call including the facsimile message. Step 102 continues by determining if the destination is available to receive a telephone call—the time of this determination being designated as the "first time".

If the destination is available at the first time, then the method proceeds to step 106 by transmitting the facsimile message to the destination. If, however, the destination is unavailable at the first time the method proceeds as shown in step 104 by storing the facsimile message on the messaging platform. If the facsimile message was stored the method proceeds by determining, as shown in step 108, if the destination is available at some later time—to be designated the "second time". If the destination is available at the second time, the method proceeds to step 106 and transmits the facsimile message. If, however, the destination is unavailable at the second time, the method proceeds back to step 108 and continues to try again to find the destination available.

It is worthwhile to note that, in the method described above, the facsimile message is stored on the messaging platform only if the destination is unavailable at the first time. This means that other facsimile messages can be routed to the destination without storage and without using the messaging platform. This allows the messaging platform to have either lower memory requirements to handle normal call volume or, alternatively, allows greater call capacity for a fixed memory size.

In one embodiment of the present invention, the number of times that the step 108 is repeated is limited to some finite number n. After trying n times to reach the destination, an error message, indicating that the facsimile message could not be sent to the destination is, instead, routed back to the originating fax. This avoids a potential problem where the destination, due to some fault or error, would not become available within a reasonable period of time. This also allows the user at the originating fax to know that the facsimile message did not go through and gives the user the opportunity to check the number for the destination and possibly to check into the operation status of the fax machine at the destination.

In an alternative embodiment of the present invention, if the number or delivery attempts to the destination have been exhausted, rather than sending a facsimile message to the originating fax machine, an administrative facility, such as a service bureau, can be notified of the failure along with the content of the facsimile message. In this fashion, administrative personnel can try to manually send the facsimile message or can take other steps such as contacting the originator of the facsimile message.

In an additional embodiment of the present invention, the way that the failure to deliver a facsimile message is handled is dependent upon a failure condition. The messaging platform will continue to attempt to deliver a facsimile message to the destination if the destination repeatedly busy or there is no answer. If, however, the platform recognizes that a fax tone is not returned upon answer (implying a voice answer) then delivery attempts may be canceled after a fewer number of retries so as not to annoy the receiver. The number of retries allowed in either failure condition may be a system administration parameter that is constant for all users. Alternatively, the number of retries allowed for each failure condition could be customized at subscriber request for each subscriber if desired.

The methods described above, if the facsimile message were stored, would generally require initiating a new telephone call to the destination. In a further embodiment of the present invention, if the destination was unavailable at the first time, the method proceeds to "camp-on" the destination to wait for the destination to become available. In this fashion, once an indication is received that the destination is available the transmission of the facsimile message to the destination can be initiated. In this embodiment, a timer could be set to time the period that the system has camped-on a particular destination. After a predetermined time period has been exceeded, this method would resort to routing an error message back to the originating fax machine to indicate the message could not be sent.

In the various embodiments described above, a stored facsimile message could also be erased from the messaging platform after the message is properly sent or after the messaging platform determines that the message cannot be sent. This allows the particular portions of memory on the messaging platform used to store the facsimile message to be reused to store additional messages.

It should also be noted that the various methods described above and the other embodiments of the present invention described herein—like a normal facsimile transmission—operate by having the user initiate a facsimile transmission to the telephone number corresponding to the destination. They enter the telephone number of destination on their fax machine. The fax machine operates as normal and the message is transmitted—either to the messaging platform or to the destination. In either case the fax machine itself is free for sending and receiving additional faxes. The user does not direct the facsimile message to the messaging platform. The facsimile message is routed to the messaging platform only if the destination is unavailable.

Figure 2:
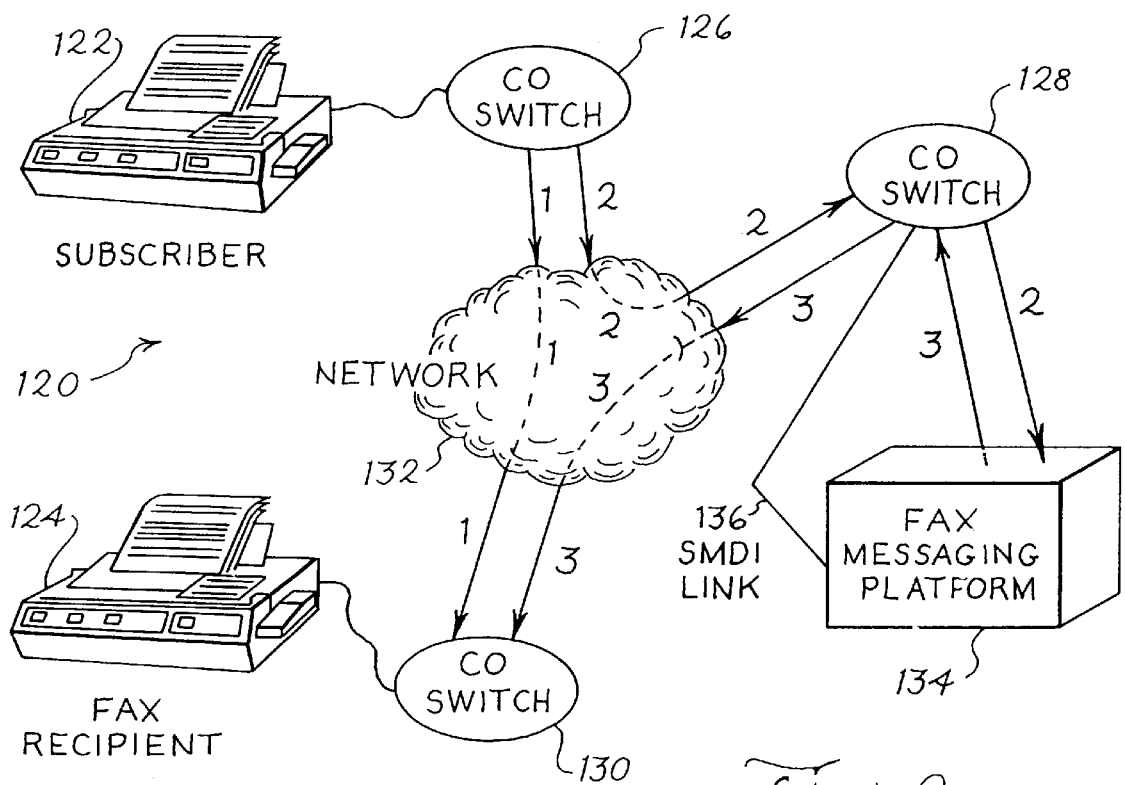
FIG. 2 presents a block diagram representation of a telecommunication system in accordance with the present invention.

FIG. 2 presents a block diagram representation of a telecommunication system in accordance with the present invention. Telecommunication system 120 is provided to route a facsimile message from subscriber fax unit 122 to fax recipient 124. Telecommunication system 120 includes central office switches 126, 128 and 130 that are interconnected via network 132. In addition, messaging platform 134 is provided and is connected to central office switch 128 by means of a simplified message desk interface (SMDI) link 136.

In operation, the subscriber attempts to send a facsimile message to fax recipient 124. If fax recipient 124 answers then the facsimile message is routed as shown in path 1 through central office switches 126 and 130.

If the fax recipient 124 is busy or does not answer, the facsimile message is routed as shown in path 2 through central office switches 126 and 128 to messaging platform 134 for storage and redelivery. In a preferred embodiment, direct inward dialing (DID) is used to transmit the facsimile message from the central office switch 128 to messaging platform 134. The messaging platform 134 then attempts to call the fax recipient's line to deliver the stored fax as shown by path 3. In a preferred embodiment, a feature group D (FGD) protocol is used to communicate between the messaging platform 134 and the central office switch 128. If the facsimile message cannot be delivered on the first attempt, the platform will continue trying, based on a defined schedule, to deliver the facsimile message.

Figure 3:
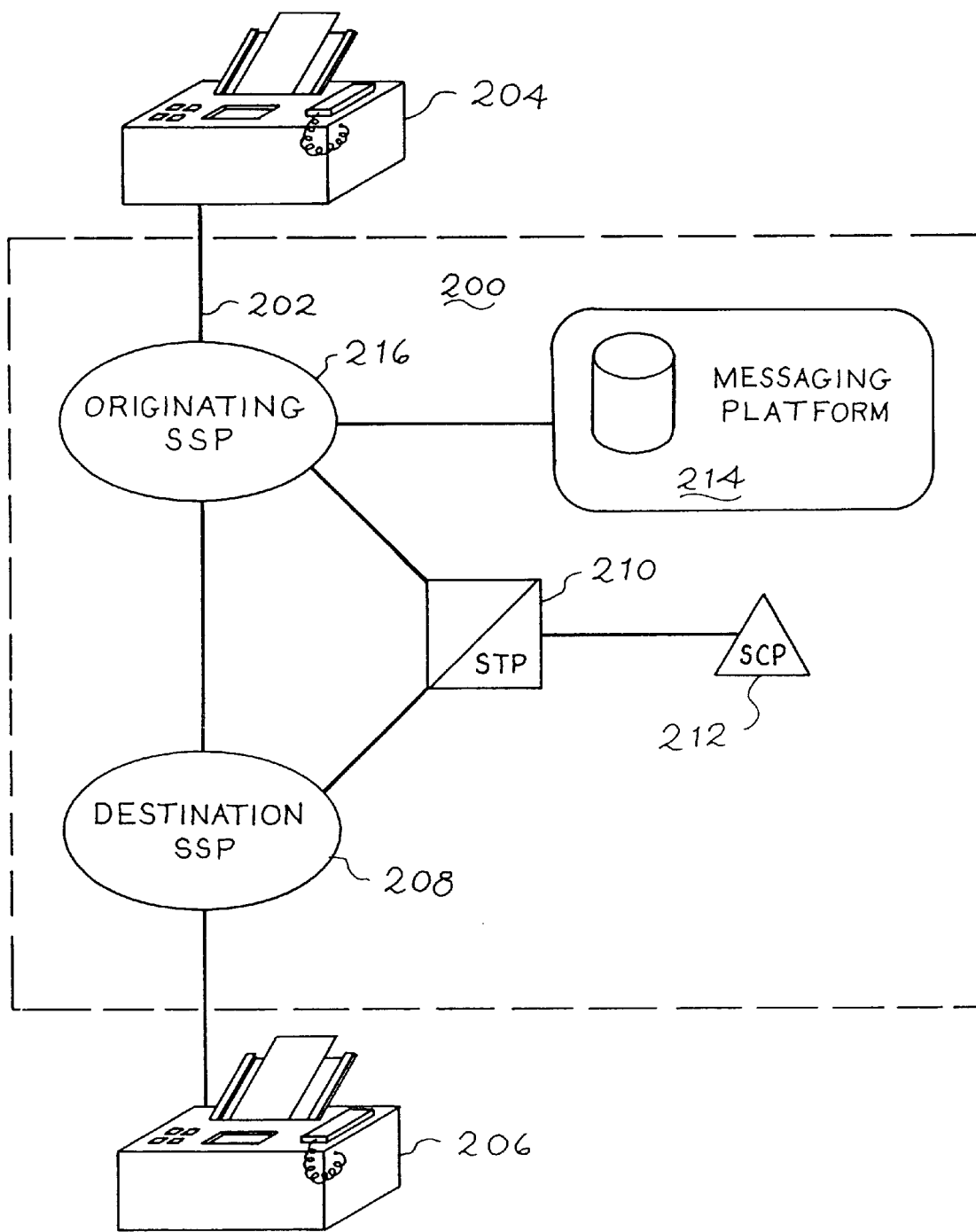
FIG. 3 presents a block diagram representation of a telecommunication system in accordance with an alternative embodiment of the present invention.

FIG. 3 presents a block diagram representation of a telecommunication system in accordance with an alternative embodiment of the present invention. In this embodiment the various methods described herein can also be implemented. In particular, a telecommunication system 200 is included for transmitting a facsimile message from a line 202 of an originating party, corresponding to an originating fax machine 204, to a destination having a destination fax machine 206 using an advanced intelligent telecommunication network such as the SS7 network. In a preferred embodiment the 0.2 AIN system features are used in the implementation of the system described herein.

The system includes an originating service switching point 216 for detecting an initiation of a telephone call on the telecommunications network to the destination by detecting an off-hook delay trigger assigned to the line 202 of the originating party and for suspending the telephone call and launching a information message if the off-hook delay trigger is detected. Destination service switching point 208 corresponds to the destination fax machine 206. Signaling transfer point 210 transfers messages to and from the originating service switching point and the destination service switching point and the service control point 212.

Service control point 212, through signaling transfer point 210, receives the information message from the originating service switching point 216, and in response, determines a destination condition for the destination. In one embodiment of the present invention, the SCP 212 launches a query to destination SSP 208 to determine the destination condition. The destination SSP 208 responds to the SCP 212 with a reply of either "busy" indicating the destination is currently on a call, "no-answer" indicating the destination does not pick-up the call or "answer" indicating that the destination picks-up the call and answers. The time that this destination condition was determined will be designated, the "first time".

If the destination condition was "answer" at the first time, the service control point 212 launches a transmit message to the originating service switching point to transmit the facsimile message to the destination. If, and only if the destination condition was "busy" or "no-answer" at the first time, the SCP 212 launches a routing message from the at least one service control point to the originating service switching point to route the telephone call. In this case, a messaging platform 214, capable of storing a plurality of facsimile messages, receives and stores the routed facsimile message. If the facsimile message was routed to the messaging platform, the messaging platform attempts to complete the call at a later time—designated as the "second time" and the messaging platform transmits the facsimile message to the destination if the destination condition was "answer" at the second time.

In one embodiment of the present invention a plurality of messaging platforms are provided, the service control point determines the telephone number corresponding to the message platform using a lookup-table that is indexed by a telephone number corresponding to the calling party. The calling party number is passed to the SCP 212 from the originating SSP 216 via the information message. The SCP 212 looks up the calling party number in a database to find a corresponding number for the messaging platform 214 that serves that particular calling party. The SCP 212 then effectuates the routing of the facsimile message to the messaging platform 214 by sending a routing message to originating SSP 216 that includes the telephone number of the messaging platform 214. The called party field for the call in the SS7 protocol is changed from the destination telephone number to the number for the messaging platform 214. More particularly, the original called party number is assigned to the redirecting party ID field.

In one embodiment of the present invention the system described above is implemented as follows. The information message sent by the originating service switching point 216 to the service control point 212 includes a Information Collected Query as allowed in the 0.2 AIN protocol. In this embodiment, the service control point 212 determines the destination condition by sending an Analyze Route Message (including a Next Invent List) to the destination service switching point 208. Once a response is received by the service control point 212, the service control point 212 returns the Analyze Route Message to the originating service switching point 216. If the destination condition was "busy" or "no answer" then the Analyze Route Message includes the telephone number of the messaging platform 214.

In an alternative embodiment of the present invention the advanced intelligent network provides a Busy or No Answer trigger. In this embodiment the originating service switching point 216, by means of the Busy or No Answer trigger, determines itself that the facsimile message cannot be directly transmitted to the destination. An Analyze Route Message is sent by the originating service switching point 216 to the service control point 212. The service control point 212 returns the Analyze Route Message to the originating service switching point 216 with the telephone number of the messaging platform 214 corresponding to the subscriber line to be used to store and redeliver the facsimile message.

In the embodiments of the present invention described above, the facsimile message is stored and forwarded for all destinations that are in a busy or no answer condition that originate from a calling party that subscribes to the particular service. In an alternative embodiment, each subscriber has an option of providing a list of priority numbers for which the service would apply. In this embodiment, the service would only be invoked in busy or no answer calls made to the destinations on this list. Other calls would be treated normally, without the invocation of this store and forward service.

Figure 4:
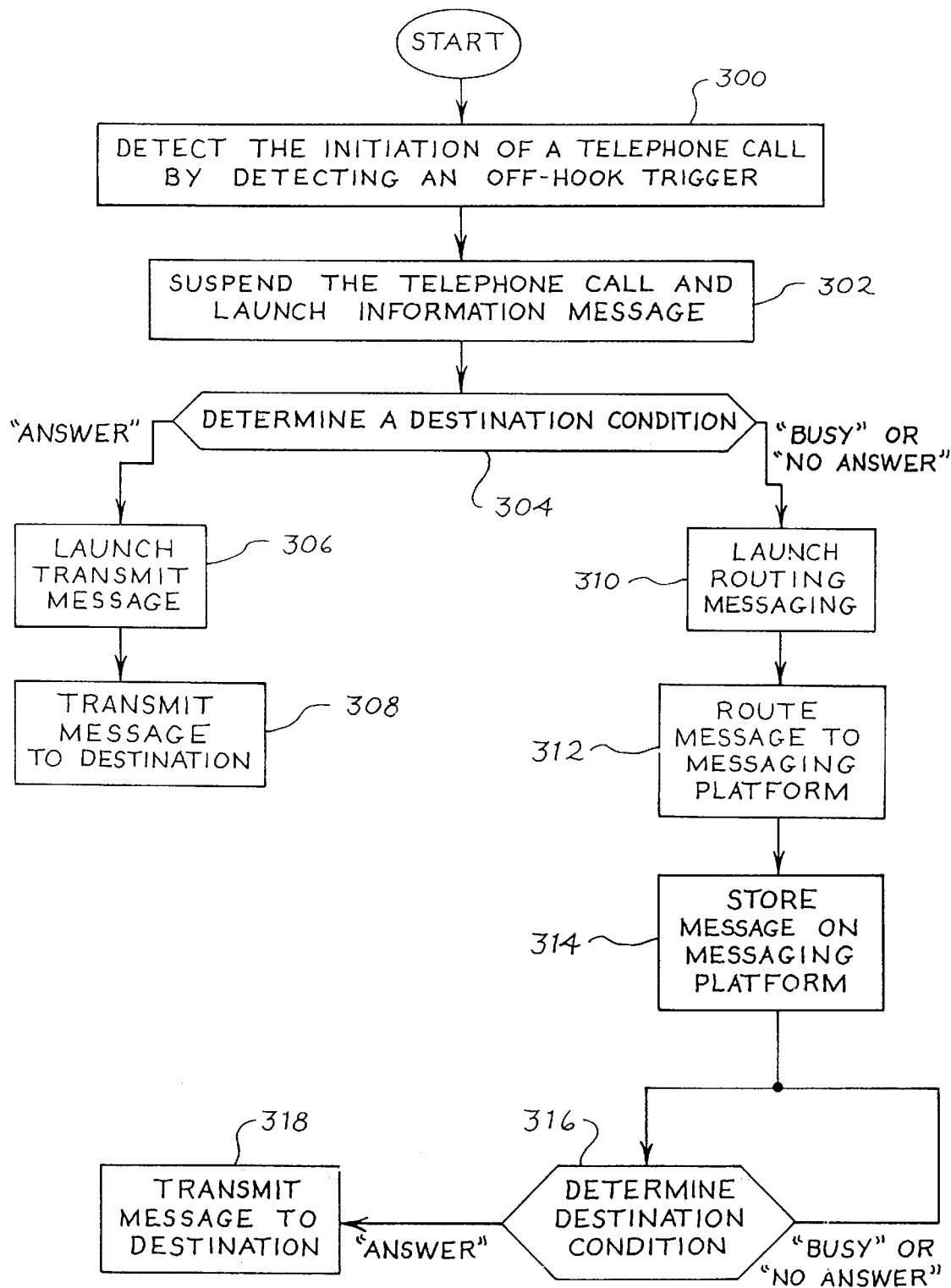
FIG. 4 presents a flowchart representation of a method in accordance with the present invention.

FIG. 4 presents a flowchart representation of a method in accordance with the present invention. The method further describes an embodiment of the present invention used in the operation of the system shown in FIG. 3. In particular, a method is presented for transmitting a facsimile message from a line of an originating party to a destination using an advanced intelligent telecommunication network having a plurality of service switching points including an originating service switching point and a destination service switching point, and at least one service control point, and a messaging platform capable of storing a plurality of facsimile messages.

The method begins in step 300 by detecting an initiation of a telephone call on the telecommunications network to the destination, by detecting an off-hook delay trigger assigned to the line of the originating party. In step 302, the telephone call is suspended and an information message is launched from the originating service switching point to the at least one service control point if the off-hook delay trigger is detected. In step 304, a destination condition is determined for the destination at a first time using the at least one service control point. In step 306, if the destination condition is answer, a transmit message is launched from the at least one service control point to the originating service switching point to transmit the facsimile message, as shown in step 308, to the destination.

If the destination condition is "busy" or "no answer" a routing message is launched as shown in step 310 from the at least one service control point to the originating service switching point to route the telephone call to the messaging platform as shown in step 312. If the facsimile message was routed to the messaging platform, the routed facsimile message is stored on the messaging platform as shown in step 314. In step 316 a destination condition is determined at a second time. If the destination condition at the second time is "answer", the facsimile message is transmitted to the destination as shown in step 318. If the destination condition was "busy" or "no answer" the method returns to step 316 (optionally after some delay) to determine the destination condition again.

Figure 5:
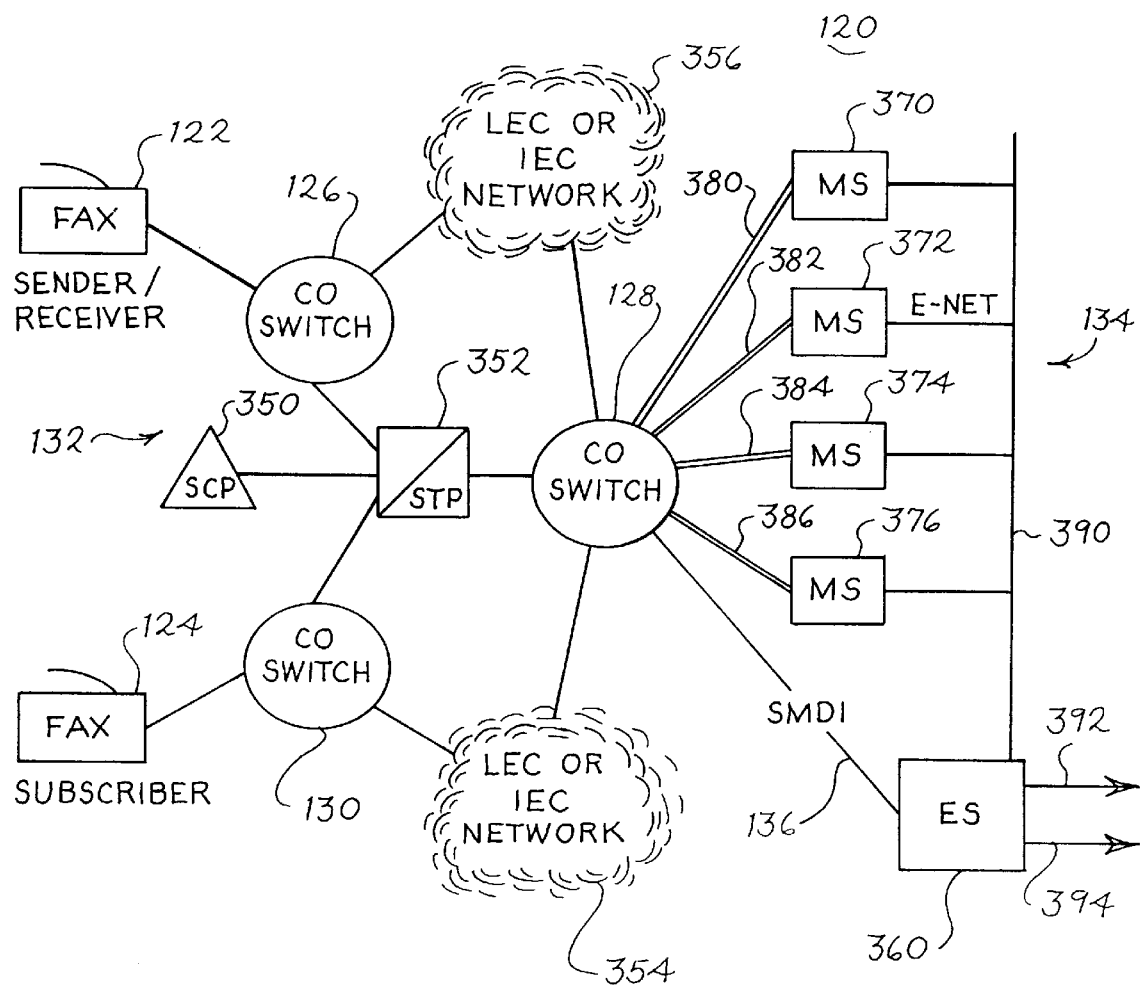
FIG. 5 presents a block diagram representation of a telecommunication system in accordance with a further embodiment of the present invention.
Figure 6:
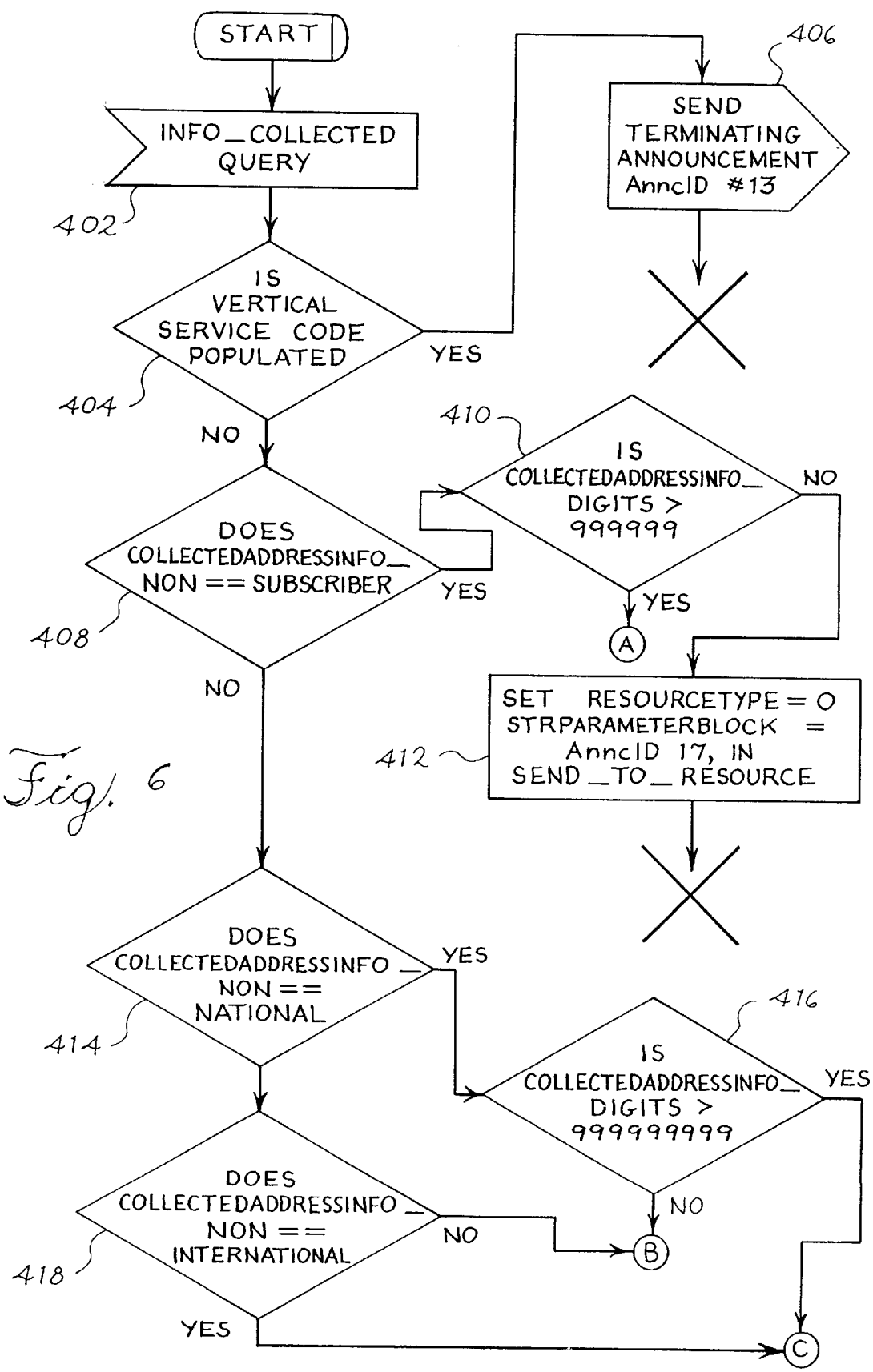
FIGS. 6–9 present flowchart representations in accordance with a further embodiment of the present invention.
Figure 7:
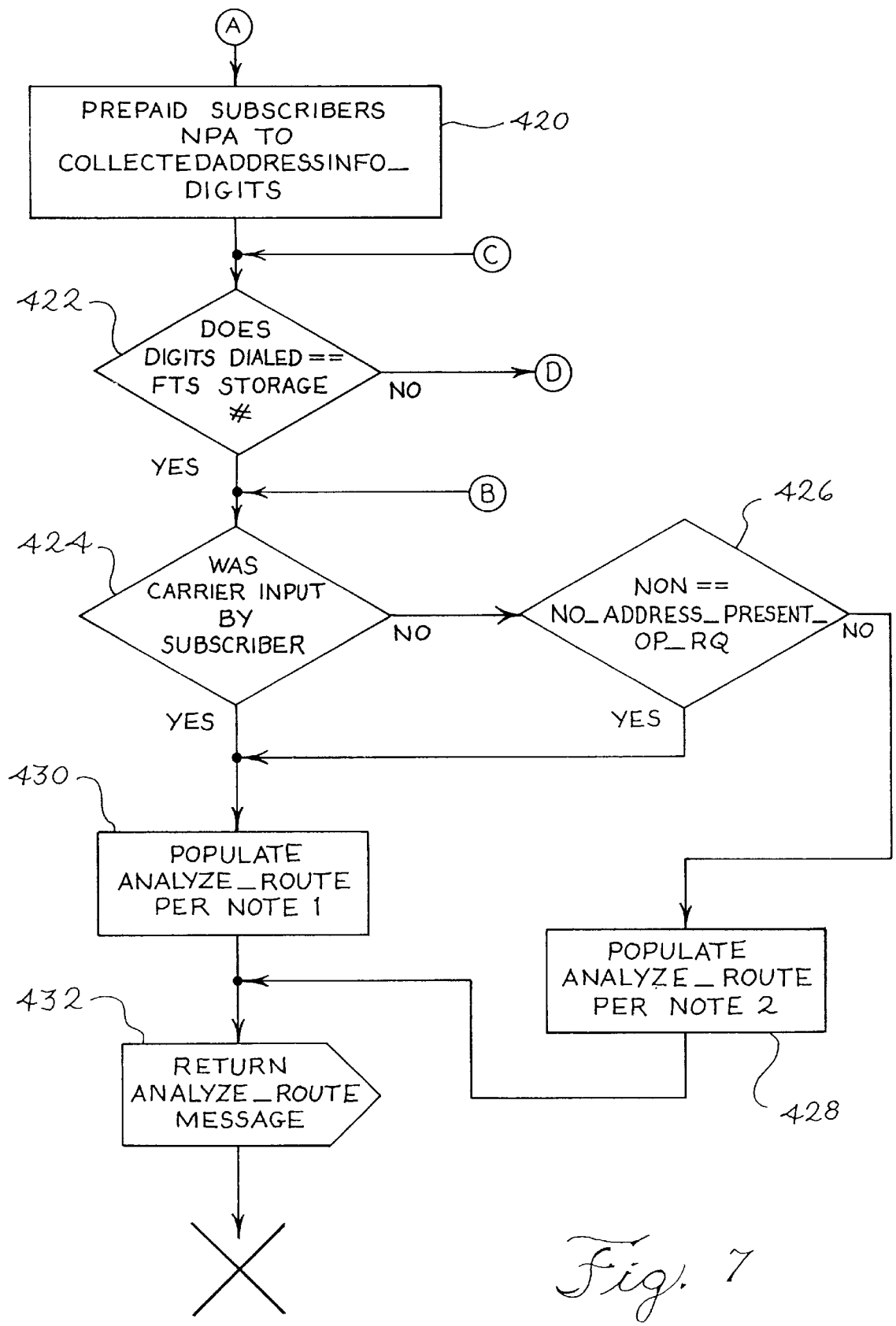
Figure 8:
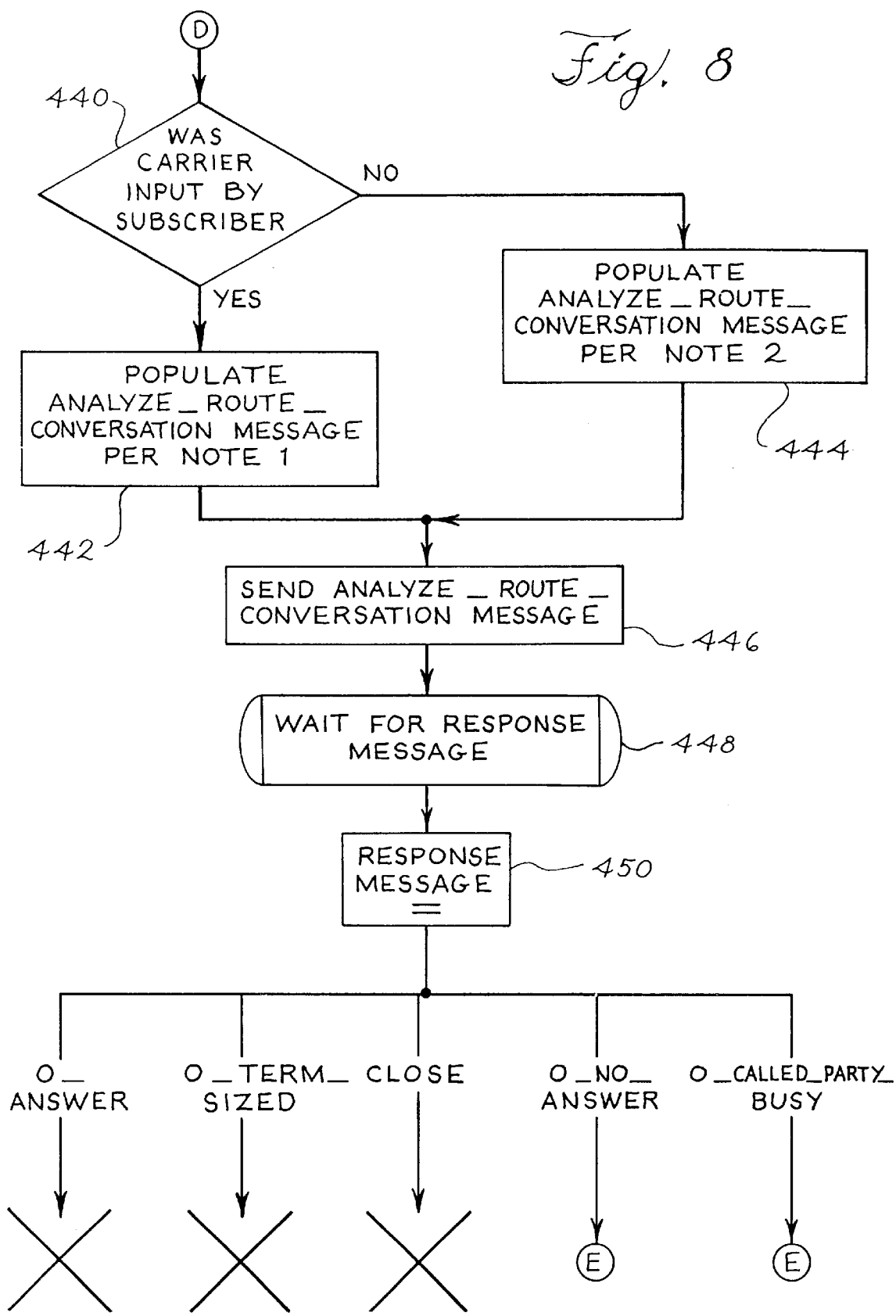
Figure 9:
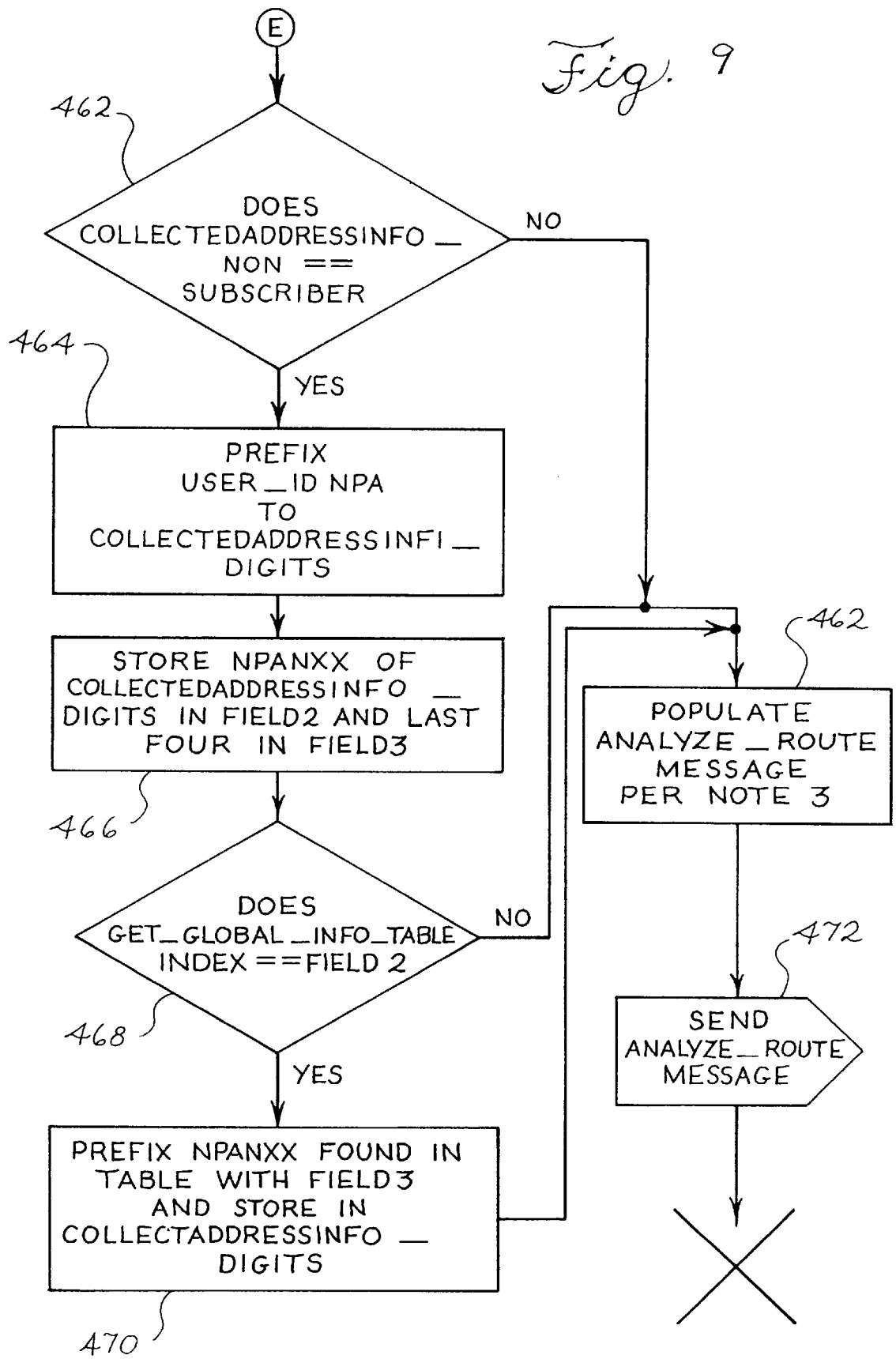

FIG. 5 presents a block diagram representation of a telecommunication system in accordance with a further embodiment of the present invention. As in the embodiments described in conjunction with FIG. 2, telecommunication system 120 is provided to route a facsimile message from subscriber fax unit 122 to fax recipient 124. Telecommunication system 120 includes central office switches 126, 128 and 130 that are interconnected via network 132. Network 132 includes service control point 350, signaling transfer point 352, local exchange carrier network 354 network 356 (that can be either a local exchange carrier network or a interexchange carrier network). These elements are interconnected by Signaling System 7 trunks.

Messaging platform 134 is provided and is connected to central office switch 128 by means of a multiline hunt group (MLHG) on T1 facilities associated with simplified message desk interface (SMDI) link 136. More particularly, the SMDI link 136 connects the central office switch 128 to a executive server 360 that coordinates the operation of the messaging platform 134 and provides billing, provisioning and administrative information via packet network connection 392. In addition, the executive server provides a connection 394 to a maintenance and monitoring system (not shown) for maintenance purposes.

A plurality of media servers 370–376 are connected to the central office switch 128 by means of a like plurality of 2-way DID trunks on T1 facilities 380–386. The media servers 370–376 provide storage facilities for a plurality of stored facsimile messages. These media servers communicate with the executive server 360 by means of an ethernet local data network 390.

FIGS. 6–9 present flowchart representations in accordance with a further embodiment of the present invention. In particular, these flowcharts represent specific procedures to be performed by a service control point in response to a Information Collected Query from an originating service switching point. In step 402, an information_collected query is received by the service control point. If the called party number has a star code prefix this indicates a vertical service code. If a vertical service code is detected in step

404, then the service control point returns an announcement number to the originating service switching point to play a message to the user as shown in step 406, such as a fast busy signal, indicating that the caller has entered an incorrect sequence for this service and control of the call is returned to the service switching point. If no vertical service code is detected, the method proceeds to step 408.

In an alternative embodiment of the present invention, a vertical service code could be used to activate or deactivate a feature of the service. In particular, the service itself may be activated or deactivated on either a sustained or call-by-call basis.

In step 408, the service control point checks the calling party number to determine if the calling party is a subscriber to the service. If the calling party number corresponds to a service subscriber the service control point then checks to see if the calling party number has at least 7 digits. This is performed by deterring if the calling party number is greater than 999999 as shown in step 410. If the calling party number is not greater than 999999, then the service control point returns an announcement, as shown in step 412, and control of the call to the originating service switching point. In response, the service switching point plays a message to the user that indicates that the particular call cannot be completed as dialed. If the calling party number is greater than 999999, the method proceeds to step 420.

If the calling party number does not correspond to a service subscriber, the method proceeds to step 414 where the service control point determines if the calling party number starts with a one and includes a valid area code. If so, the calling party number is checked to see if it conforms to the national numbering plan (the standard 1+area code+seven digit number). This step is performed as shown in step 416 by determining if the calling party number is greater than 999999999. If so, the method proceeds to step 422. If not, the method proceeds to step 424.

If the prefix of the calling party number does not correspond to a "1" followed by a valid area code in step 414, the method proceeds to step 418 where the service control point determines if a valid international number is present. If so, the method proceeds to step 422; if not, the method proceeds to step 424.

In step 420, the area code (NPA) is prepended to the calling party number. In step 422, the service control point determines if the called party number corresponds to the messaging platform number—indicating that the user has attempted to send a message to the messaging platform directly. If this is the case, the method proceeds to step 424 to begin to handle the call without the application of the service. If the called party number does not correspond to the messaging platform, the method proceeds to step 440.

In step 424, the service control point determines if a particular inter-exchange carrier has been designated by the calling party. If so, the method proceeds to step 430 and an analyze route message is populated as shown in note 1 of Table 1. If not, the service control point determines if an operator has been requested as shown in step 426. If no operator has been requested then the method proceeds to step 428 to populate the analyze route message as shown in note 2 in Table 1. If, however, an operator has been requested, then the method proceeds to step 430. In any case, as shown in step 432, this analyze route message is transmitted to the originating service switching point where control of the call is returned.

In step 440, the service control point determines if a particular inter-exchange carrier has been designated by the calling party. If so, the method proceeds to step 442 and an analyze route message is populated as shown in note 1 of Table 1. If not, the method proceeds to step 444 to populate the analyze route message as shown in note 2 in Table 1. In either case, an analyze route conversation message is sent to the destination service switching point in an attempt to complete the call as shown in step 446. The service control point then waits for a response as shown in step 448. If the response from the destination service switching point is either "answer" indicating that the call has been answered, or "originating termination" indicating that the calling party has hung-up, or "close" indicating that the destination service switching point is no longer processing the call, then the control of the call is returned to the originating service switching point.

If the response from the destination service switching point is either "busy" or "no answer", the method proceeds to step 460. In step 460, the service control point determines if the calling party number corresponds to a service subscriber. If the calling party is not a subscriber, the method proceeds directly to step 462. If the calling party is a service subscriber the method proceeds to step 464 where the messaging platform area code (NPA) is substituted for the calling party area code. In step 466, the called party number is stored in two fields; the area code and exchange in one field and the last four digits of the called party number in another field. In step 468, the service control point determines if the area code and exchange of the called party match the area code and exchange of the messaging platform indicating that the messaging platform and the called party are served by the destination service switching point. If not, the method proceeds directly to step 462. If the area code and exchange match the area code and exchange of the messaging platform, the method first proceeds to step 470 where the original four digits of the called party number are prepended with an area code and exchange that are determined from a look up table. In step 462, the analyze route message is populated as shown in note 3 of Table 1 and control of the call is returned to the originating service switching point. This routes the call to the messaging platform for storage if the calling party is a subscriber to the service.

The parameters of the analyze route message sent from the service control point to the originating service switching point and the analyze route conversation message sent from the service control point to the destination service switching point, as described above, are shown in Table 1. The ChargeNumber corresponds to the Automatic Number Identification (ANI) of the calling party. The CallingPartyID contains the Directory Number (DN) of the calling party. The ChargePartyStationType contains the calling station type. The ChargeNumber, the CallingPartyID and the ChargePartyStationType are all populated with information supplied by the originating service switching point to the service control point via an Info_Collected message. The CalledParty_Digits are populated by the DN of the called party in cases covered by notes 1 & 2 and by CNS_Substitute_Billing_DN, a substituted billing number, in cases covered by note 3. The Traveling Class Mark (TCM) is a class of service indicator used with SS7 trunking. The RedirectingPartyID contains the DN of the called party. The PrimaryCarrier corresponds to an identification code that identifies the primary carrier for the subscriber. The AMAslpID is a billing parameter used to bill a leg of the call. Note 1: ChargeNumber, CallingPartyID, ChargePartyStationType, CalledParty_Digits= CollectedAddressInfo, Tcm, RedirectingPartyID, and PrimaryCarrier. Note 2: ChargeNumber, CallingPartyID, ChargePartyStationType, CalledParty_Digits= CollectedAddressinfo, Tcm, and RedirectingPartyID. Note 3: ChargeNumber, CallingPartyID, ChargePartyStationType, CalledParty_Digits=CNS_ Substitute_DN, Tcm, RedirectingPartyID_Digits= CollectedAddressinfo_Digits, and AMAslpID=008470000.

TABLE 1

Note 1: ChargeNumber, CallingPartyID, ChargePartyStationType, CalledParty_Digits= CollectedAddressInfo, Tcm, RedirectingPartyID, and PrimaryCarrier.
Note 2: ChargeNumber, CallingPartyID, ChargePartyStationType, CalledParty_Digits= CollectedAddressInfo, Tcm, and RedirectingPartyID.
Note 3: ChargeNumber, CallingPartyID, ChargePartyStationType, CalledParty_Digits=CNS_ Substitue_Billing_DN, Tcm, RedirectingPartyID_Digits= CollectedAddressInfo_Digits, and AMAsIpID=008470000.

In an embodiment of the present invention where the originating service switching point, by means of a Busy or No Answer trigger, determines itself that the facsimile message cannot be directly transmitted to the destination, the steps performed by the service switching point described above could begin with step 460 and the remaining functions could reside in the originating service switching point.

Figure 10:
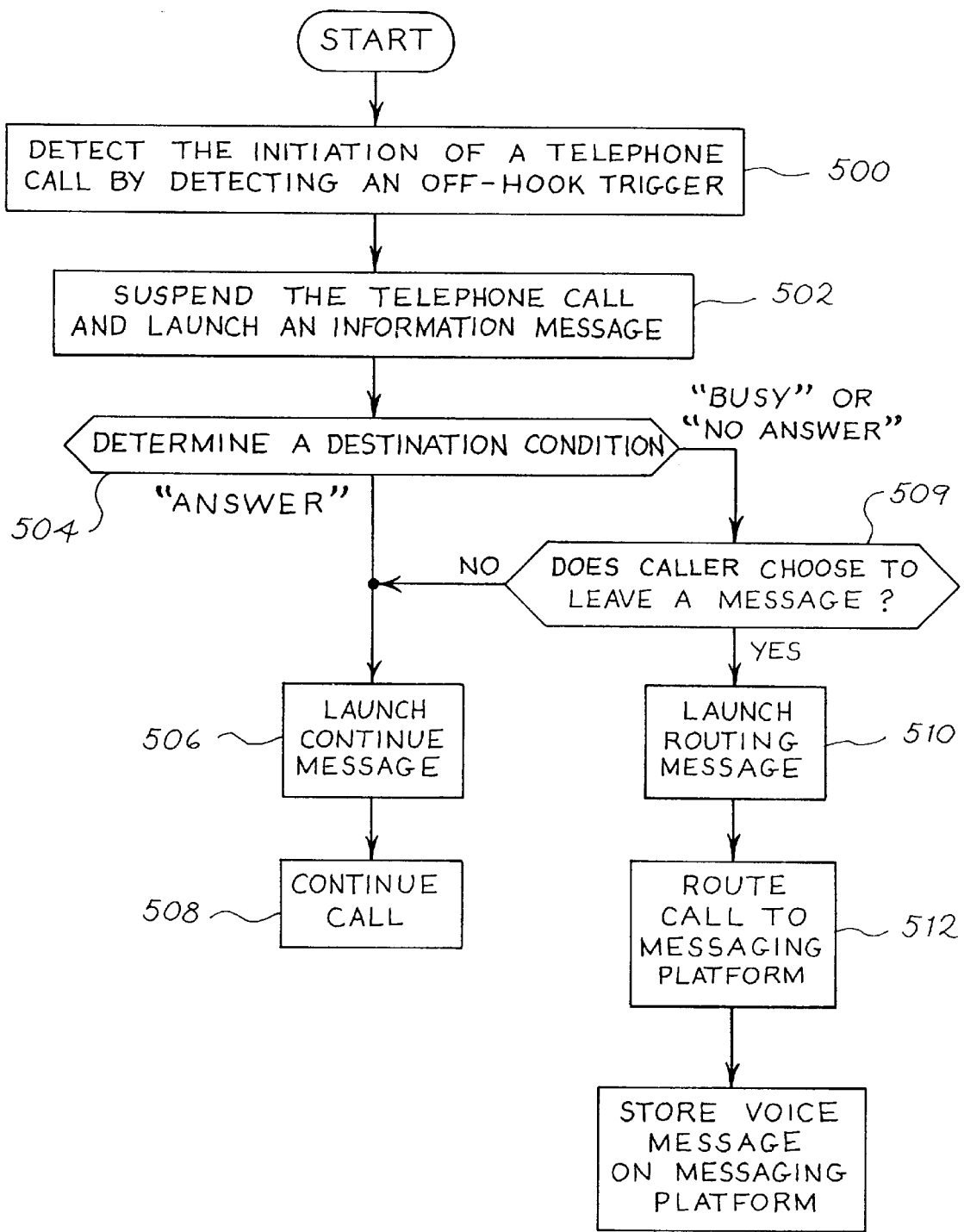
FIG. 10 presents a flowchart representation of a method in accordance with another embodiment of the present invention.

FIG. 10 presents a flowchart representation of a method in accordance with another embodiment of the present invention. In particular, this method is usable in conjunction with the systems described herein to transmit and store voice messages. The method begins in step 500 by detecting an initiation of a telephone call on the telecommunications network to the destination, by detecting an off-hook delay trigger assigned to the line of the originating party. In step 502, the telephone call is suspended and an information message is launched from the originating service switching point to the at least one service control point if the off-hook delay trigger is detected. In step 504, a destination condition is determined for the destination at a first time using the at least one service control point. In step 506, if the destination condition is answer, a continue message is launched from the at least one service control point to the originating service switching point to continue the telephone call, as shown in step 508, to the destination.

If the destination condition is "busy" or "no answer" the caller is queried as shown in step 509, using interactive response techniques, to determine if the caller would like to leave a voice message. If the caller indicates that no voice message will be left then the method proceeds to step 506 to continue the call. If, however, the caller indicates that a voice message will be left a routing message is launched as shown in step 510 from the at least one service control point to the originating service switching point to route the telephone call to the messaging platform as shown in step 512. If the call was routed to the messaging platform, the voice message is stored on the messaging platform as shown in step 514. This stored voice message is held for retrieval by an authorized person at the destination in a manner similar to standard voice mail systems.

The method described above could also be modified for operation in an alternative embodiment where the advanced intelligent network is capable of providing a Busy or No Answer trigger. In this embodiment the originating service switching point, by means of the Busy or No Answer trigger, determines itself that the telephone call cannot be directly transmitted to the destination. An Analyze Route Message is sent by the originating service switching point to the service control point. The service control point returns the Analyze Route Message to the originating service switching point with the telephone number of the messaging platform corresponding to the subscriber line to be used to store and voice message.

While portions of the description herein has referred to the transmission of facsimile messages, the methods and systems described are likewise suited for applications in other areas of data transmission. In particular other applications of the present invention include: credit verification transactions where a credit card is scanned at a point of sale and a credit card database is accessed; communications involved with the transfer of billing and/or sales data; market transaction data transfers; automated teller machine transactions; and communications involving the sale of lottery tickets.

While the various embodiments of the present invention have been described in conjunction with a public switched telephone network, these embodiments could similarly apply to communications of messages over other communication networks. In particular, facsimile messages and voice messages, within the scope of the present invention, be transmitted using data communications networks such as the internet.

The various methods described herein, in a preferred embodiment, are intended for operation as software programs running on a computer processor. One of ordinary skill in the art will recognize that other hardware implementations such as application specific integrated circuits, programmable logic arrays and other hardware devices could likewise be constructed to implement the methods described herein. In should also be noted that the various methods of the present invention could be stored on a tangible storage medium such as a magnetic or optical disk, read-only memory or random access memory and be produced as an article of manufacture.

Thus, there has been described herein a concept, as well as several embodiments including a preferred embodiment, of a method and telecommunication system for transmitting of a facsimile message. Because the various embodiments of methods and systems store a facsimile message only if the destination is unavailable as herein described, they provide a significant improvement over the prior art. Additionally, the various embodiments of the present invention hereindescribed have other features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall the true spirit and scope of the invention.

What is claimed is:

1. A method of transmitting a facsimile message from a line of an originating party to a destination using an advanced intelligent telecommunication network having a plurality of service switching points including an originating service switching point and a destination service switching point, and at least one service control point, and a messaging platform capable of storing a plurality of facsimile messages, the method comprising the steps of:

detecting an initiation of a telephone call on the telecommunications network to the destination, by detecting an off-hook delay trigger assigned to the line of the originating party;

suspending the telephone call and launching a information message from the originating service switching point to the at least one service control point if the off-hook delay trigger is detected;

determining a destination condition for the destination at a first time using the at least one service control point;

launching a transmit message from the at least one service control point to the originating service switching point to transmit the facsimile message to the destination if the destination condition was "answer" at the first time;

launching a routing message from the at least one service control point to the originating service switching point to route the telephone call to the messaging platform only if the destination condition was "busy" or "no-answer" at the first time; and if the facsimile message was routed to the messaging platform,
(i) storing the routed facsimile message on the messaging platform;
(ii) determining a destination condition at a second time, the second time later than the first time; and
(iii) transmitting the facsimile message to the destination if the destination condition was "answer" at the second time.

2. The method of claim 1 wherein the routing message contains a telephone number corresponding to the message platform, to which the facsimile message is to be routed.

3. The method of claim 2 wherein the step of launching a routing message includes determining the telephone number corresponding to the message platform using a lookup-table that is indexed by a telephone number corresponding to the calling party.

4. The method of claim 1 further comprising the step of sending a close call message from a destination service switching point to the at least one service control point if the call is completed.

5. The method of claim 1 further comprising the step of sending a close call message from the originating service switching point to the at least one service control point if the telephone call is abandoned prior to receiving a routing message from the at least one service control point.

6. The method of claim 1 further comprising the step determining that the destination is not a valid destination for receiving the facsimile message.

7. The method of claim 6 further comprising the step of aborting the telephone call if the destination is not a valid destination for receiving a facsimile.

8. A telecommunication system for transmitting a facsimile message from a line of an originating party to a destination using an advanced intelligent telecommunication network, the system comprising:

an originating service switching point for detecting an initiation of a telephone call on the telecommunications network to the destination, by detecting an off-hook delay trigger assigned to the line of the originating party and for suspending the telephone call and launching a information message if the off-hook delay trigger is detected;

a destination service switching point in communication with the destination;

a signaling transfer point, coupled to the originating service switching point and the destination service switching point, for transferring messages to and from the originating service switching point and the destination service switching point;

a service control point, in communication with the signaling transfer point, for receiving the information message from the originating service switching point, for determining a destination condition for the destination at a first time for launching a transmit message to the originating service switching point to transmit the facsimile message to the destination if the destination condition was "answer" at the first time, and for launching a routing message from the at least one service control point to the originating service switching point to route the telephone call only if the destination condition was "busy" or "no-answer" at the first time; and a messaging platform, in communication with the originating service switching point and capable of storing a plurality of facsimile messages, for receiving and storing the routed facsimile message;

wherein, if the facsimile message was routed to the messaging platform, the messaging platform determines a destination condition at a second time, the second time later than the first time; and the messaging platform transmits the facsimile message to the destination if the destination condition was "answer" at the second time.

9. The system of claim 8 wherein the routing message contains a telephone number corresponding to the message platform, to which the facsimile message is to be routed.

10. The system of claim 9 wherein the service control point determines the telephone number corresponding to the message platform using a lookup-table that is indexed by a telephone number corresponding to the calling party.

11. The system of claim 8 wherein the destination service switching point sends a close call message from a destination service switching point to the service control point if the call is completed.

12. The system of claim 8 wherein the originating service switching point is capable of sending a close call message to the service control point if the telephone call is abandoned prior to receiving a routing message from the at least one service control point.

13. The system of claim 8 wherein the service control point is capable of determining that the destination is not a valid destination for receiving the facsimile message.

14. The system of claim 13 wherein the service control point aborts the telephone call if the destination is not a valid destination for receiving a facsimile.

15. A method of transmitting a facsimile message using a public-switched telecommunications network, the public-switched telecommunications network having a messaging platform operative, store a plurality of facsimile messages, the method comprising the steps of:

detecting an initiation of a telephone call on the telecommunications network from a calling party to a destination, the content of the call including the facsimile message;

determining if the destination is available at a first time to receive a telephone call, said determining being made with switching components of the public-switched telecommunications network associated with the calling party;

transmitting the facsimile message to the destination if the destination is available at the first time;

storing the facsimile message on the messaging platform only if the destination is unavailable at the first time; and if the facsimile message was stored,
(i) determining that the destination is available at a second time, the second time later than the first time; and (ii) transmitting the facsimile message to the destination if the destination is available at the second time.

16. The method of claim 15 further comprising the step of:

if the destination is unavailable at the first time, camping-on the destination to wait for the destination to become available.

17. The method of claim 15 wherein the step of transmitting the facsimile message to the destination if the destination is available at the second time, includes initiating a new telephone call to the destination.

18. The method of claim 15 wherein the destination has a corresponding telephone number and the step of initiating a telephone call includes initiating the telephone call to the telephone number of the destination.

19. A method of transmitting a data message from a line of an originating party to a destination using an advanced intelligent telecommunication network having a plurality of service switching points including an originating service switching point and a destination service switching point, and at least one service control point, and a messaging platform capable of storing a plurality of data messages, the method comprising the steps of:

detecting an initiation of a telephone call on the telecommunications network to the destination, by detecting an off-hook delay trigger assigned to the line of the originating party;

suspending the telephone call and launching a information message from the originating service switching point to the at least one service control point if the off-hook delay trigger is detected;

determining a destination condition for the destination at a first time using the at least one service control point;

launching a transmit message from the at least one service control point to the originating service switching point to transmit the data message to the destination if the destination condition was "answer" at the first time;

launching a routing data message from the at least one service control point to the originating service switching point to route the telephone call to the messaging platform only if the destination condition was "busy" or "no-answer" at the first time; and if the data message was routed to the messaging platform,
(i) storing the routed data message on the messaging platform;
(ii) determining a destination condition at a second time, the second time later than the first time; and
(iii) transmitting the data message to the destination if the destination condition was "answer" at the second time.

* * * * *

UNITED STATES PATENT AND TRADEMARK OFFICE
CERTIFICATE OF CORRECTION

PATENT NO. : 5,974,122
DATED : October 26, 1999
INVENTOR(S) : Mark H. Nelson et al.

It is certified that error appears in the above-identified patent and that said Letters Patent is hereby corrected as shown below:

On the Title Page

In column 2, line 12, under "ABSTRACT", delete "if the destination".

In claim 1, line 13, after "launching" delete "a" and substitute --an-- in its place.

In claim 8, line 10, before "information" delete "a" and substitute --an-- in its place.

In claim 15, line 4, delete "operative, store" and substitute --operative to store-- in its place.

UNITED STATES PATENT AND TRADEMARK OFFICE
CERTIFICATE OF CORRECTION

PATENT NO. : 5,974,122
DATED : October 26, 1999
INVENTOR(S) : Mark H. Nelson et al.    Page 2 of 2

It is certified that error appears in the above-identified patent and that said Letters Patent is hereby corrected as shown below:

In claim 19, line 13, before "information" delete "a" and substitute --an-- in its place.

Signed and Sealed this

Twenty-second Day of May, 2001

Attest:

NICHOLAS P. GODICI

Attesting Officer    Acting Director of the United States Patent and Trademark Office